United States Patent [19]

Hatch

[11] Patent Number: 4,726,975
[45] Date of Patent: Feb. 23, 1988

[54] METHOD AND APPARATUS FOR ADAPTING SEPARABLE FASTENERS FOR ATTACHMENT TO OTHER OBJECTS

[75] Inventor: Richard N. Hatch, Hooksett, N.H.

[73] Assignee: Actief N.V. ABN Trust Co., Curacao, Netherlands Antilles

[21] Appl. No.: 910,494

[22] Filed: Sep. 23, 1986

Related U.S. Application Data

[63] Continuation-in-part of Ser. No. 756,005, Jul. 17, 1985.

[51] Int. Cl.[4] ............................................. A44B 21/00
[52] U.S. Cl. .................................. 428/100; 428/308.4; 428/311.1; 428/317.1; 428/120; 428/900; 428/329; 24/444
[58] Field of Search .................. 24/306, 444; 428/100, 428/900, 120, 308.4, 311.1, 317.1, 329

[56] References Cited

U.S. PATENT DOCUMENTS 4,470,857  9/1984  Casalou .
4,563,380  7/1984  Black et al. .
4,617,214  10/1986  Billarant .

FOREIGN PATENT DOCUMENTS 2556271  6/1985  France .

Primary Examiner—Alexander S. Thomas
Attorney, Agent, or Firm—Hayes, Davis & Soloway

[57] ABSTRACT

An improvement for attaching fastener strips to other objects wherein a strip of fastener material is formed into the surface of urethane foam or the like during molding in a mold. The fastener material comprises a backing strip having an outer surface adapted to mate with the foam material during molding and a fastener strip having an outer surface comprising one-half of a fastening system such as hook and loop fastening material. The backing strip and the fastener strip are attached to one another with their respective inner surfaces in face-to-face relationship with their outer surfaces facing outward. The fastener material fits within a longitudinal groove in the mold and the backing material overlaps the groove. The invention comprises an improved apparatus including a backing strip that is wider than the fastener strip and provides exposed strips on both sides of the fastener strip. A pair of strips of polyethylene film is attached to the exposed strips only along lines adjacent the edges of the fastener strip and forms two unattached gasket strips for contacting the mold and preventing entry of the foam-forming liquid into the groove.

14 Claims, 12 Drawing Figures

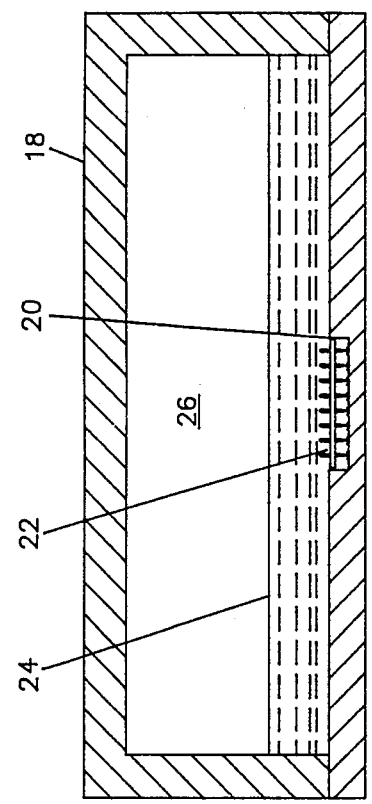
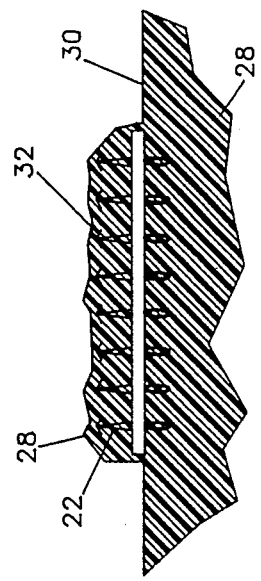
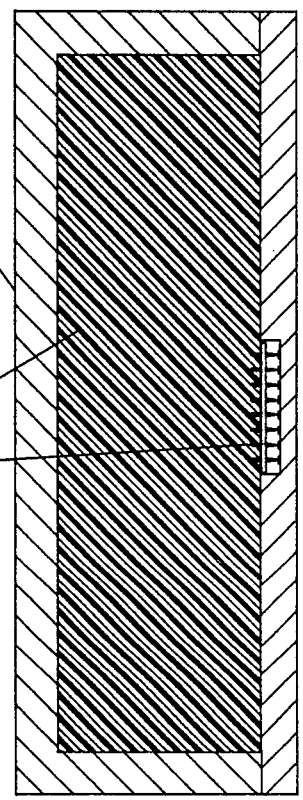
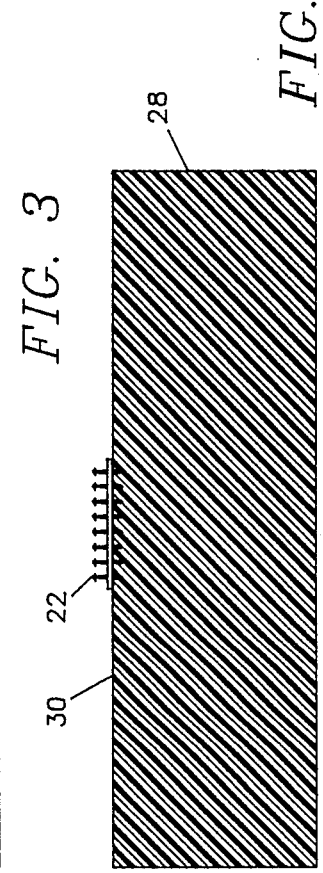
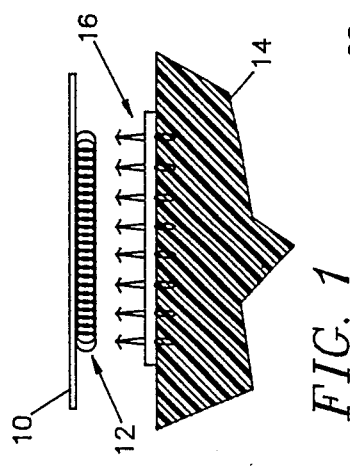
FIG. 1
FIG. 2
FIG. 3
FIG. 4
FIG. 5

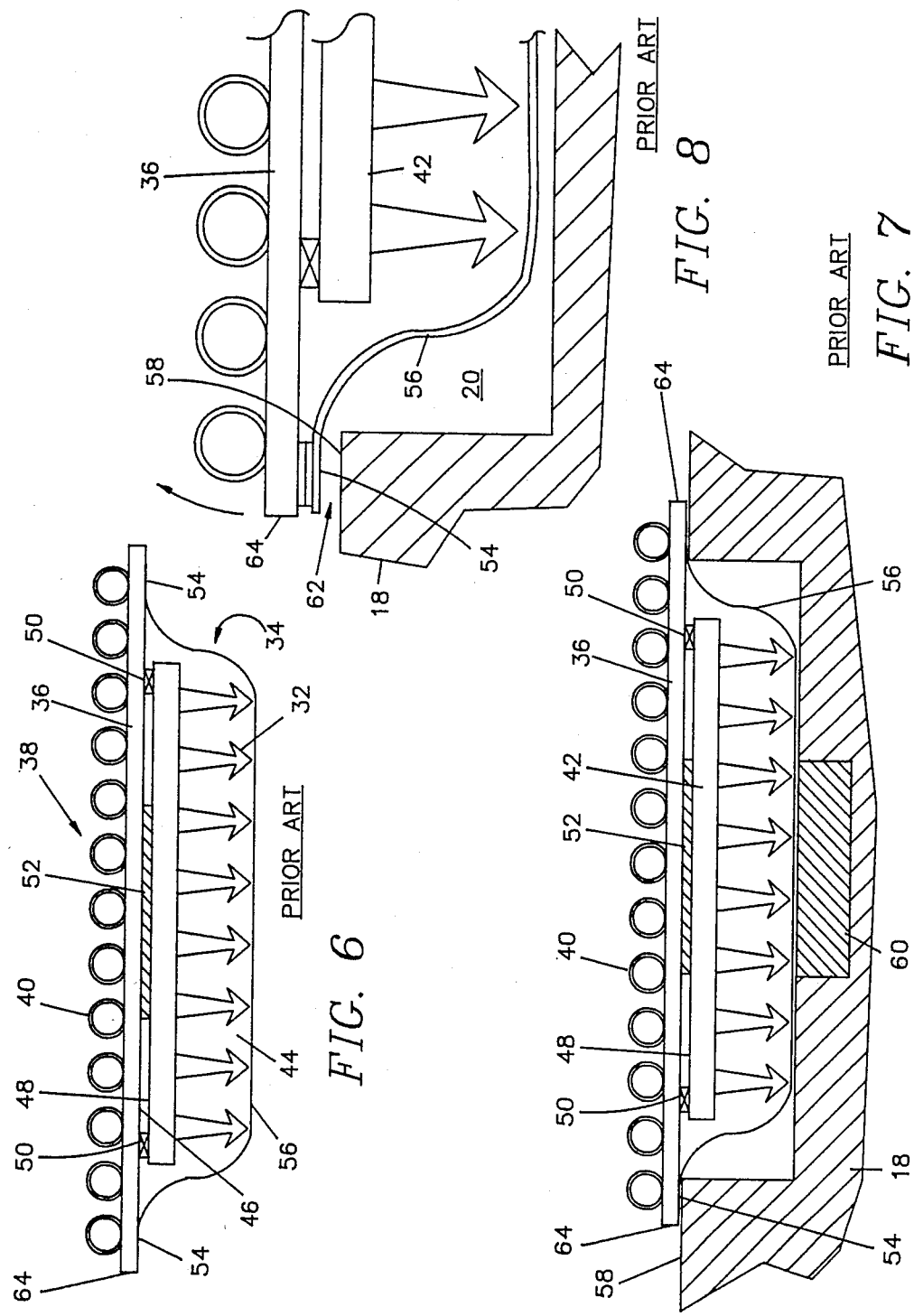

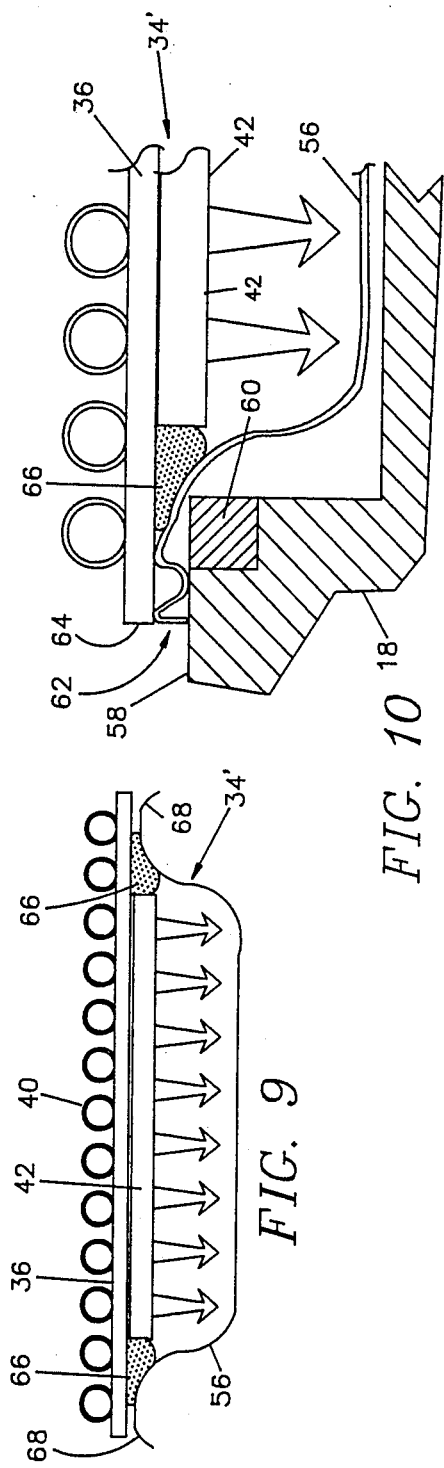
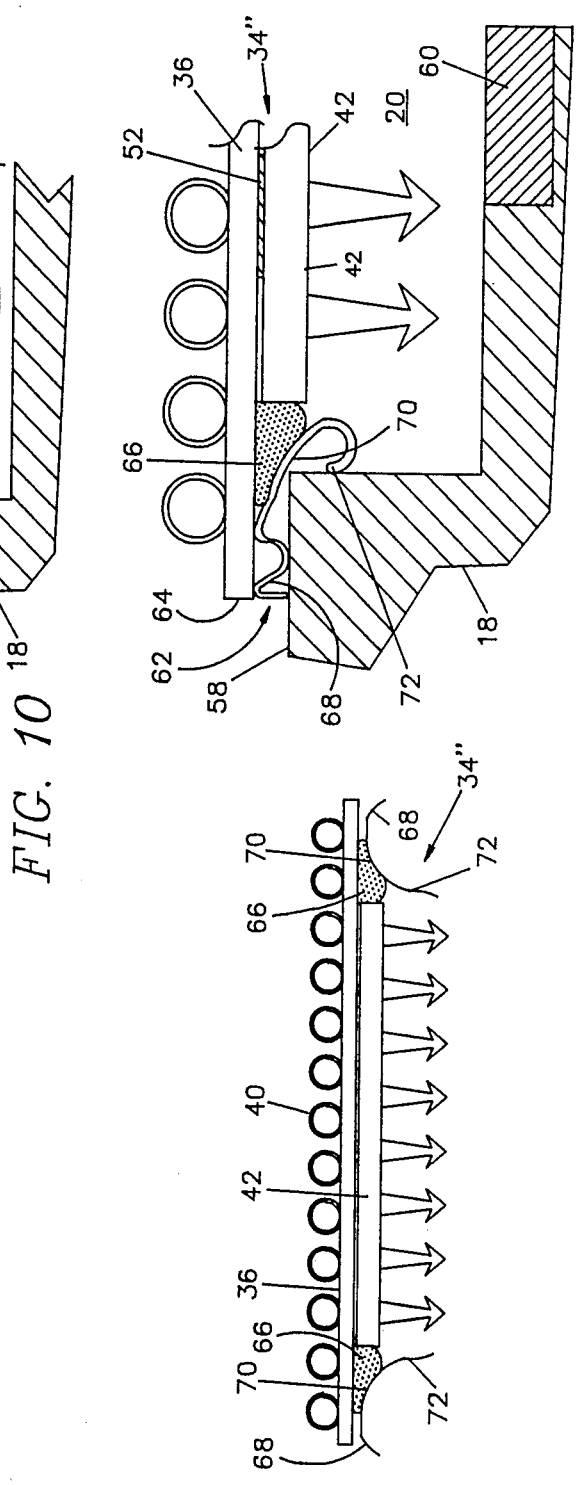
FIG. 9
FIG. 10
FIG. 11
FIG. 12

METHOD AND APPARATUS FOR ADAPTING SEPARABLE FASTENERS FOR ATTACHMENT TO OTHER OBJECTS

BACKGROUND OF THE INVENTION

This application is a Continuation-in-Part of application Ser. No. 756,005 filed July 17, 1985.

The present invention relates to a method and associated apparatus for adapting touch fasteners, particularly those of the hook and loop type, for attachment to other objects such as polyurethane foam, and the like; and, more particularly, in a process wherein a strip of fastener material is formed into the surface of urethane foam or the like during molding in a mold wherein the fastener material comprises a backing strip having an outer surface adapted to mate with the foam material during molding and a fastener strip having an outer surface comprising one-half of a fastening system such as hook and loop fastening material, wherein the backing strip and the fastener strip are attached to one another with their respective inner surfaces in face-to-face relationship with their outer surfaces facing outward, and wherein the fastener material fits within a longitudinal groove in the mold and the backing material overlaps the groove, to an improved method and associated apparatus for preventing the liquid foam-forming material from entering the groove and contaminating the outer surface of the fastener strip; wherein the method comprises the steps of: (a) forming the backing strip to be wider than the fastener strip; (b) disposing the fastening strip on the backing strip so as to have equal strips of the inner surface of the backing strip exposed on either side of the outer surface of the fastener strip; (c) disposing a pair of strips of polyethylene film along respective ones of the equal strips with the film strips attached to the equal strips along lines adjacent the edges of the fastener strip and extending between the outer edges of the one-half of the fastening material and the outer edges of the backing strip to form two unattached gasket strips of the film along either side of the fastening material; and, (d) prior to introducing the foam-producing liquid into the mold, positioning the strip of fastener material in the mold with the gasket strips forming a first pair of gaskets along the respective lines where the backing material contacts the mold adjacent to the groove and forming a second pair of gaskets along the respective lines where the fastener strip abuts the sidewalls of the groove.

Hook and loop fastening material such as that sold by the assignee of this application under the trademark Velcro is a popular article of manufacture having numerous uses. Such Velcro hook and loop fastening material comprises two components. Each has a flexible backing material having one component of the fastening system on the surface thereof. One surface is comprised of a resilient hooks while the other is comprised of a short pile loop fabric. When the two fastening surfaces are pressed together, the hooks releasably ensnar the loops, thus releasably holding the materials together. They can be separated by pulling the components apart with sufficient force to cause the resilient hooks to straighten sufficiently to come out of engagement with the loops.

Typically, the flexible backing material is attached to the surfaces to be joined by adhesive ultrasonic welding or stitching. The Velcro hook and loop fastening materials are particularly well suited for releasably attaching covering material to foam plastic cushions, and the like, such as used in cars and aircraft. The strips being attached to the fabric covering are easily attached in a conventional manner as described above, such as by stitching. The attachment of the mating strips to the foam plastic, on the other hand, was found to be best accomplished by molding it into the surface of the foam plastic during the molding process itself. The result is shown in FIG. 1. The fabric 10 has one-half of the hook and loop fastening material, generally indicated as 12, attached thereto. Typically, it is the loop portion so that the fabric 10 can be removed and washed in a washing machine without snagging on other articles being washed at the same time in the machine. The foam cushion is indicated as 14 and has the other half of the hook and loop material 16 (typically the hook portion) molded into the surface as shown. An early example of the process is shown in the patent of Casalou U.S. Pat. No. (4,470,857).

An early improvement to the molding process, along with an attendant undesirable result that accompanied it, is shown in FIGS. 2–5. As shown in FIG. 2, the mold 18 has a groove 20 into which the strip 22 of the hook and loop material is disposed. The foam-forming liquid 24 is then introduced into the mold cavity 26, covering the bottom of the mold, including the groove 20 and the strip 22. The foam-forming liquid 24 is then caused to foam and fill the cavity 26 in a manner well known to those skilled in the art such as to create the desired cushion 28 within the cavity 26 as shown in FIG. 3. When removed from the mold 18, the cushion 28 appears as in FIG. 4 with the strip 22 generally flush with the outer surface 30 and with the hooks 32 projecting outward therefrom. Unfortunately, the result was quite often as shown in greater detail in FIG. 5; that is, the foamed plastic of the cushion 28 also filled the area of the hooks 32 as a result of the foam-forming liquid 24 flowing into the groove 20 and surrounding the hooks 32 prior to or during the foaming process.

Advancements to the overall process of molding the fastener strip in place as well as solving the above-described problem of the foam material entering and fouling the fastener hooks was addressed in U.S. Pat. No. 4,563,380 of Black, et al. The technique thereof is shown in simiplified form in FIGS. 6–8. As shown in FIG. 6, the fastener portion to be embedded within the surface of the cushion 28 is a composite strip generally indicated as 34. Composite strip 34 comprises a backing strip 36 having an outer surface 38 adapted to mate with the foam material during the molding process. Outer surface 38 can comprise fabric loops 40, hooks, or the like; that is, any surface which will be surrounded by the foam-forming liquid 24 and end up embedded into and adjacent to the outer surface 30 of the cushion 28 previosuly described. The composite strip 34 further comprises a fastener strip 42 having an outer surface 44 comprising one-half of the hook and loop fastening material such as the hooks 32 as indicated. While touch fasteners in the form of hook and loop fastening material is described herein, it should be appreciated by those skilled in the art that other touch fastening systems could also be used in the manner described hereinafter with similar benefits.

The backing strip 36 and the fastener strip 42 are attached to one another with their respective inner surfaces 46, 48 in face-to-face relationship so that the outer surfaces 38, 44 face outward as shown in FIG. 6.

The backing strip 36 and the fastener strip 42 can be connected as at 50, in several manners well known to those skilled in the art, such as the use of hot-melt adhesive or ultra-sonic welding. A thin strip 52 of ferrous material is sandwiched between the backing strip 36 and fastener strip 42 for a purpose to be disclosed presently. As will be noted, the backing strip 36 is wider than the fastener strip 42 such that equal strips 54 of the inner surface 46 of the backing strip 36 are disposed on either side of the fastener strip 42 when viewed from outer surface 44. To protect the hooks 32 during the molding process and eliminate the fouling depicted in FIG. 5, a thin film of polyethylene sheet 56 is disposed over the hooks 32 and fastened to the equal strips 54 (again in any of several manners known to those skilled in the art) as shown in FIG. 6.

In use, before the foam-forming liquid 24 is introduced into the mold 18, the composite strip 34 of FIG. 6 is disposed within the groove 20 in the manner shown in FIG. 7. The fastener strip 42 fits within the groove 20 as shown in FIG. 7. As can be seen, it is intended that the equal strips 54 of the backing strip 36 rest on the upper outer edges 58 of the bottom of the mold 18 adjacent the groove 20 with the polyethylene sheet 56 sandwiched therebetween. A magnet 60 is disposed beneath the groove 20 with the intention that the metal strip 52 be attracted thereby so as to hold the composite strip 34 within the groove 20 and, correespondingly, the equal strips 54 against the upper outer edges 58 so as to prevent the flow of the foam-forming liquid 24 therethrough. Unfortunately, while workable in theory, in actuality, the prior art technique of FIGS. 6 and 7 also suffers from problems as depicted in FIG. 8. As shown therein, the magnet 60 performs its desired function by pulling the center of the composite strip 34 towards the bottom of the groove 20. As the backing strip 36 heats from the temperatures of the molding process, however, it often arches upward from the center such that a space 62 is created between the polyethylene sheet 56 in the region of the equal strips 54 and the upper outer edges 58 adjacent the groove 20 through which the foam-forming liquid 24 can still pass. Additionally, the technique of FIGS. 6 and 7 only works in a production environment when a post-curing process at a temperature above that required to melt the polyethylene sheet 56 is employed so as to expose the hooks 32 for use. Where no such post-curing temperature is employed, the polyethylene sheet 56 must be painstakingly removed from the finished cushion 28 following the molding process.

Wherefqre, it is the object of the present invention to provide a method and apparatus for molding a fastener strip into a foam cushion, or the like, during the molding process wherein an effective seal is created along the edge of the groove containing the active surface of the fastening material during the molding process.

It is a further object of the present invention to provide such a molding process wherein no high temperature post-molding procedure is required to remove a protective polyethylene sheet from the active surface of the fastener strip.

SUMMARY

The foregoing object has been accomplished in a strip of fastener material adapted for forming into the surface of urethane foam and the like during molding in a mold wherein the fastener material comprises a backing strip having an outer surface adapted to mate with the foam material during molding and a fastener strip having an outer surface comprising one-half of a touch fastening system such as hook and loop fastening material, wherein the backing strip and the fastener strip are attached to one another with their respective inner surface in face-to-face relationship with their outer surfaces facing outward, and wherein the fastener material fits within a longitudinal groove in the mold and the backing material overlaps the groove, by the improvement for preventing the liquid foam-forming material from entering the groove and contaminating the outer surface of the fastener strip comprising, the backing strip being wider than the fastener strip and being disposed to provide equal strips of the inner surface of the backing strip exposed on either side of the outer surface of the fastener strip; and, a pair of strips of polyethylene film disposed along respective ones of said equal strips, said film strips being attached to said equal strips along lines adjacent the edges of the fastener strip and extending between the outer edges of the one-half of the fastening material and the outer edges of the backing strip to form two gasket strips a long either side of the fastening material for contacting the mold to prevent entry of the foam-forming liquid into the groove such that when the strip of fastener material is positioned in the mold said gasket strips form a first pair of gaskets along the respective lines where the backing material contacts the mold adjacent to the groove and form a second pair of gaskets along the respective lines where the fastener strip abuts the sidewalls of the groove.

In the preferred embodiment, the pair of strips each extends over the respective outer edge of the backing strip.

DESCRIPTION OF THE DRAWINGS

FIG. 1 is a simplified side view showing the type of end product with which the present invention is associated.

FIG. 2 is a simplified cutaway side view of a mold as wherein the present application is applicable at the point in time when foam-producing liquid has been introduced therein.

FIG. 3 shows the mold of FIG. 2 after the liquid has been foamed.

FIG. 4 shows the product produced by the molding procedure of FIG. 2 and 3 in its ideal configuration following removal from the mold.

FIG. 5 is an enlarged view of the attachment strip portion of the article of FIG. 4 disclosing a problem common to the molding step which is eliminated by the present invention.

FIG. 6 is a drawing showing a prior art approach to adding a protective cover over the fastener strip prior to positioning it within the mold.

FIG. 7 shows the strip of FIG. 6 as positioned within a mold groove.

FIG. 8 is an enlarged view showing the manner in which the sides of the strip overlap the edges of the groove in the prior art leaving a gap through which liquid can enter to foul the fastening surface.

FIG. 9 shows a strip of fastener material according to the present invention in a first embodiment.

FIG. 10 is a detailed view of one side of the strip of FIG. 9 when disposed in the mold groove.

FIG. 11 shows a strip of fastener material according to the present invention in a second and preferred embodiment thereof.

FIG. 12 is a detailed view of one side of the strip of FIG. 11 showing the manner in which it forms a pair of gaskets along either side of the mold groove.

DESCRIPTION OF THE PREFERRED EMBODIMENT

A first (although not preferred) embodiment of the present invention is shown in FIG. 9 and 10. This embodiment can be used where it is desired to cover the hooks 32 with a polyethylene sheet 56 because a post-molding process of sufficient temperature to remove the polytheylene sheet is employed. Whereas in the prior art technique of FIGS. 6 and 7, the polyethylene sheet 56 was attached from the edge of the backing strip 36 at 64 inward and the metal strip 52 was positioned in the middle of the composite structure 34, as shown in FIGS. 9 and 10, in this embodiment, the polyethylene sheet 56 is attached to the backing strip 36 of the composite structure 34' by hot melt adhesive 66 in the region of the equal strips 54 from a point close adjacent the fastener strip 42 outward to a point intermediate (i.e. not reaching) the edge 64 of the backing strip 36. The backing strip carries a large plurality of loops (uncut hooks of a hook and loop fastener) to engage foam formed in the mold. It is actually preferred that the polyethylene sheet 56 extend on beyond the outer edge 64 to provide extra material for forming the gasket which has been found to form. While the benefits of this construction with respect to forming a gasket can improve the molding where a centrally-located metal strip 52 as shown in FIG. 6 and 7 is employed, it is also possible that the magnet 60 (or a pair of magnets if smaller magnets are desired) be located close adjacent the inner edge of the equal strips 54 where they abut the outer edges of the fastener strip 42. For this purpose, it is preferred that the metal strip 52 be replaced by ferrous particulate matter embedded in hot-melt adhesive 66, or the like, used to attach the polyethylene sheet 56 to the backing strip 36. The use of such particulate material within the bonding material is not a point of novelty of the present invention and is, in fact, known in the prior art. The positioning of the adhesive with respect to the fastening of the polyethylene sheet 56 to the backing strip 36 is, however, a point of novelty of the present invention and the combination of the magnetic force being created at the same point is also considered to be novel. As shown in FIG. 10, should any arching of the backing strip 36 take place, the unattached outer edge 68 deforms as a result of the heat of molding and the pressure of the foam-forming liquid 24 thereon to form a gasket between the backing strip 36 and the upper outer edge 58 of the mold 18 adjacent the groove 20 as shown in FIG. 10.

The preferred embodiment of the present invention is shown in FIGS. 11 and 12. This particular embodiment is preferred since it does not require a post-molding heating operation to remove the polyethylene. As shown in FIG. 11, the composite strip 34" is constructed in substantially similar manner to that of FIG. 9. Whereas a single strip of polyethylene sheet 56 was employed therein, however, in this embodiment a central magnet attachment, by strip 52, or the like, and magnets 66, is employed and a pair of strips 70 of the same polyethylene material are employed. The outer portion and method of attachment to the equal strips 54 of the backing strip 36 are identical; however, the inner edge 72 goes over the edge of the fastener strip 42 up to the point where the hooks 32 begin. The hooks 32 are, therefore, exposed at all times. Accordingly, no process is necessary to remove the polyethylene sheet 56 therefrom as in the prior art and previous embodiment. During the molding process, this construction results in two gaskets being formed on each side of the groove 20. The first or outer gasket is as described with respect to the embodiment of FIGS. 9 and 10 and is formed by the unattached outer edge 68 of the strips 70. The second or inner gasket is formed by the inner edges 72 curling and deforming from the heat of the process in the manner shown in FIG. 12. As a result, the double-gasketing system of the embodiment of FIGS. 11 and 12 prevents the flow of the foam-forming liquid therethrough and, accordingly, total coverage of the hooks 32 is unnecessary.

Thus, it can be seen that the present invention provided a valuable improvement over the prior art and accomplishes its desired objectives.

A touch fastener, as used in this application, comprises a first planar backing material having a surface carrying large plurality of hooks, mushrooms, balls on stems, pigtails, or the like capable of engaging loops, hooks, mushrooms, balls on stems, pigtails, or the like, carried by a second planar backing material to fasten components together.

Wherefore, having thus described my invention, I claim:

1. A strip of fastener material adapted for forming into the surface of urethane foam and the like during molding in a mold wherein the fastener material comprises a backing strip having an outer surface adapted to mate with the foam material during molding and a fastener strip having an outer surface comprising one-half of a touch fastening system, wherein the backing strip and the fastener strip are attached to one another with their respective inner surfaces in face-to-face relationship with their outer surfaces facing outward, and wherein the fastener material fits within a groove in the mold and the backing material overlaps the groove, characterized in that to prevent the liquid foam-forming material from entering the groove and contaminating the outer surface of the fastener strip
   (a) the backing strip is wider than the fastener strip and is disposed to provide strips of the inner surface of the backing strip exposed on either side of the outer surface of the fastener strip; and,
   (b) a pair of strips of polyethylene film are disposed along respective ones of said strips, and said film strips being attached to said strip only along lines adjacent the edges of the fastener strip and extending between the outer edges of the fastener strip and the outer edges of the backing strip to form two unattached gasket strips along either side of the fastening material for contacting the mold to prevent entry of the foam-forming liquid into the groove such that when the strip of fastener material is positioned in the mold said gasket strips form a first pair of gaskets along the respective lines where the backing material contacts the mold adjacent the groove.

2. The improvement of claim 1 wherein said gasket strips also form a second pair of gaskets along the respective lines where the fastener strip abuts the sidewalls of the groove.

3. The improvement of claim 2 wherein:
   said film strips are fastened to the backing strip from close adjacent the edges of the fastener strip to a point intermediate the edge of the fastener strip and the outer edge of the backing strip.

4. The improvement of claim 4 wherein:
said film strips are fastened to the backing strip with an adhesive material containing particles of a magnetically attractable material therein for allowing said backing material and said gaskets in combination therewith to be magnetically attracted towards the upper outer edges of the groove.

5. The improvement of claim 1 wherein:
said pair of strips each extends over the respective outer edge of the backing strip.

6. A strip of fastener material adapted for forming into the surface of urethane foam and the like during molding in a mold wherein the fastener material comprises a backing strip having an outer surface adapted to mate with the foam material during molding and a fastener strip having an outer surface comprising one-half of a touch fastening system, wherein the backing strip and the fastener strip are attached to one another with their respective inner surfaces in face-to-face relationship with their outer surfaces facing outward, and wherein the fastener material fits within a longitudinal groove in the mold and the backing material overlaps the groove, characterized in that to prevent the liquid foam-forming material from entering the groove and contaminating the outer surface of the fastener strip:

(a) the backing strip is wider than the fastener strip and is disposed to provide equal strips of the inner surface of the backing strip exposed on either side of the outer surface of the fastener strip; and, (b) a strip of polyethylene film, is disposed over the fastening strip and along respective ones of said equal strips, said film strip being attached to said equal strips only along lines adjacent the edges of the fastener strip and extending between the outer edges of the backing strip to form unattached gasket strips along either side of the fastening material for contacting the mold to prevent entry of the foam-forming liquid into the groove such that when the strip of fastener material is positioned in the mold said gasket strips form a pair of gaskets along the respective lines where the backing material contacts the mold adjacent to the groove.

7. The improvement of claim 6 wherein:
said strip extends over the outer edges of the backing strip.

8. The improvement of claim 6 wherein:
said strip is fastened to the backing strip from close adjacent the edges of the fastener strip to points intermediate the edge of the fastener strip and the outer edge of the backing strip.

9. The improvement of claim 8 wherein:
said film strip is fastened to the backing strip with an adhesive material containing particles of a magnetically attractable material therein for allowing said backing material and said gaskets in combination therewith to be magnetically attracted towards the upper outer edges of the groove.

10. A strip of improved fastener material adapted for forming into the surface of urethane foam and the like during molding in a mold containing a groove in the inner sidewalls thereof for receiving the strip of fastener material during molding comprising:

(a) a backing strip having a first outer surface on one side thereof adapted to mate with the foam during molding and a second outer surface on the other side thereof comprising one-half of a touch fastening system, said backing strip being wider than said second outer surface and said second outer surface being disposed to provide strips of said backing strip on either side of said second outer surface, said second outer surface being adapted to fit within the groove with said backing material overlapping the groove; and, (b) a pair of strips of polyethylene film disposed along respective ones of said strips of said backing strip on either side of said second outer surface to form unattached gasket strips along either side of said second outer surface for contacting the mold to prevent entry of the foam-forming liquid into the groove such that when the strip of fastener material is positioned in the mold said gasket strips form a pair of gaskets along the respective lines wherein the backing material contacts the mold adjacent to the groove.

11. The improved fastener material of claim 17 wherein:
said film strips are attached along lines adjacent to but spaced from the edges of said second outer surface thus forming two unattached gasket strips along either side of said second outer surface whereby the two innermost of said gasket strips form a second pair of gaskets along the respective lines where said second outer surface abuts the sidewalls of the groove.

12. The improved fastener material of claim 17 wherein:
said pair of strips each extends over the respective outer edge of said backing strip.

13. The improved fastener material of claim 17 wherein:
said film strips are fastened to said backing strip from adjacent the edges of said second outer surface to a point intermediate said edges of said second outer surface and the outer edges of said backing strip.

14. The improved fastener material of claim 17 wherein:
said film strips are fastened to said backing strip with an adhesive material containing particles of a magnetically attractable material therein for allowing said backing material and said gaskets in combination therewith to be magnetically attracted towards the edges of the groove in the mold.

* * * * *